United States Patent
Coleman et al.

(10) Patent No.: US 11,457,279 B1
(45) Date of Patent: Sep. 27, 2022

(54) LIVE PREVIEWING OF STREAMING VIDEO IN THE CLOUD

(71) Applicant: Amazon Technologies, Inc., Seattle, WA (US)

(72) Inventors: Michael Coleman, Portland, OR (US); Jialu Wang, North Plains, OR (US); Garrett Sparks, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 416 days.

(21) Appl. No.: 16/143,264

(22) Filed: Sep. 26, 2018

(51) Int. Cl.
*H04N 21/462* (2011.01)
*H04N 21/482* (2011.01)
*H04L 65/60* (2022.01)
*H04L 67/1074* (2022.01)

(52) U.S. Cl.
CPC .......... *H04N 21/462* (2013.01); *H04L 65/60* (2013.01); *H04L 67/1078* (2013.01); *H04N 21/482* (2013.01)

(58) Field of Classification Search
None
See application file for complete search history.

(56) References Cited

U.S. PATENT DOCUMENTS

| | | | |
|---|---|---|---|
| 9,906,568 B2 | 2/2018 | Whynot et al. | |
| 9,948,738 B2 | 4/2018 | Johnston et al. | |
| 9,985,857 B2 | 5/2018 | Balasubramanian et al. | |
| 10,033,967 B2 | 7/2018 | Segal et al. | |
| 10,069,872 B2 | 9/2018 | Ijaz | |
| 2007/0047542 A1* | 3/2007 | Thukral | H04L 43/0811 370/389 |
| 2010/0180314 A1* | 7/2010 | Kim | H04N 21/64322 348/192 |
| 2013/0127982 A1* | 5/2013 | Zhang | H04L 67/06 348/14.08 |
| 2014/0359156 A1* | 12/2014 | Manber | H04L 65/602 709/231 |
| 2016/0006819 A1* | 1/2016 | Tarricone | H04L 69/24 709/228 |
| 2019/0075477 A1* | 3/2019 | Dion | H04N 21/2402 |
| 2019/0149731 A1* | 5/2019 | Blazer | H04N 5/232935 348/39 |
| 2019/0158564 A1* | 5/2019 | Wang | H04L 41/5067 |

* cited by examiner

*Primary Examiner* — Junior O Mendoza
(74) *Attorney, Agent, or Firm* — Robert C. Kowert; Kowert, Hood, Munyon, Rankin & Goetzel, P.C.

(57) ABSTRACT

Methods, systems, and computer-readable media for live previewing of streaming video in the cloud are disclosed. A portion of a video stream is received at a cloud-based media streaming system via a network. The media streaming system generates a video preview of the portion of the video stream. The media streaming system sends the video preview to a client device via a peer-to-peer connection before an additional portion of the video stream is received by the media streaming system. The video preview is displayed on the client device.

20 Claims, 11 Drawing Sheets

LIVE PREVIEWING OF STREAMING VIDEO IN THE CLOUD

BACKGROUND

Internet-based media streaming is increasingly the choice of viewers who seek convenient access to video outside of conventional video distribution channels (including over-the-air broadcasts, cable TV, satellite TV, and prerecorded physical media). Using streaming technologies, viewers may access channels of live media (e.g., video) as well as prerecorded media from libraries of media assets that are accessible over an Internet connection. In some cases, streaming media is viewable on a wide range of devices, including desktop computers and laptop computers, tablets, smartphones, wearable computers, and specialized devices such as smart televisions. Additionally, internet-based media streaming may be used to deliver high-quality video from remote content providers to local broadcasters for conventional video distribution to viewers.

The distribution and delivery pipeline for streaming media is typically a complicated one. A media asset or live stream may first be acquired, e.g., from a broadcaster. The media may then be processed and transformed in any of several ways—potentially including compression, encryption, and other forms of encoding—for eventual distribution to viewers. A hierarchy of servers over a wide geographical area may be used to deliver the media to many viewers in an efficient manner.

Figure 1:
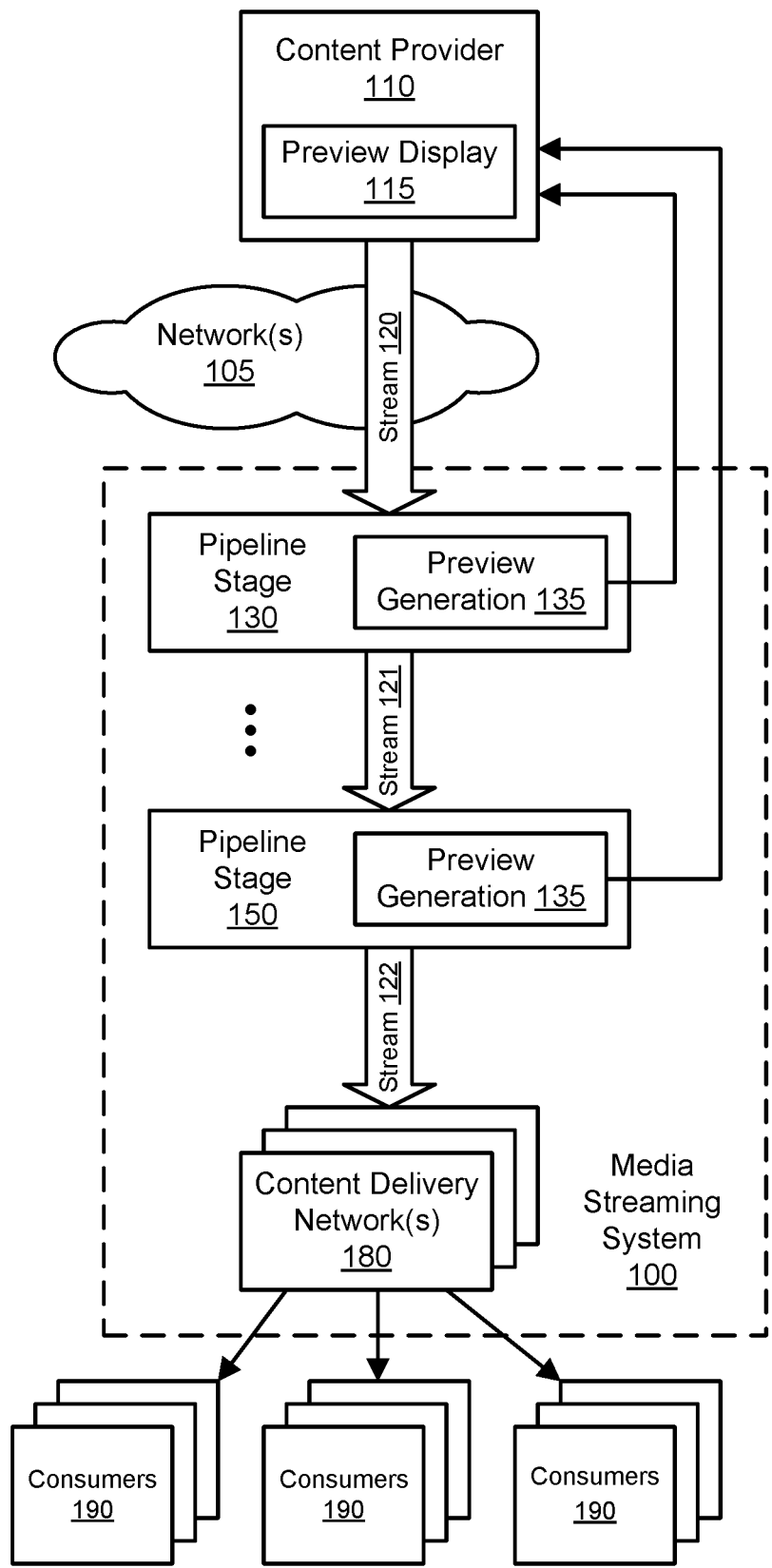
FIG. 1 illustrates an example system environment for live previewing of streaming video in the cloud, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for live previewing of streaming video in the cloud are described. A cloud-based media streaming system may enable content providers to upload their media content to the cloud. The cloud may represent a set of computing resources and/or services that are hosted in one or more data centers and accessed by clients over a network such as the Internet. Content providers may include broadcasters, distributors, and other persons and business entities that generate digital media such as video, audio, and so on. For example, a content provider on-site at a live event may start recording the event with digital video (including audio) and seek to stream the recording to the cloud while the event is ongoing. Via the media streaming system hosted in the cloud, the uploaded content may then be delivered to content consumers, such as viewers of digital media as well as other systems that may transform, distribute, or store the media. When uploading a media stream to the cloud, however, problems such as gaps in transmission may be difficult for the content provider to determine in real-time (i.e., while the stream is being uploaded and not after the fact). Using the techniques described herein, a cloud-based media streaming system may provide a content provider with a live video preview (with audio, if originally present) of content being ingested by the media streaming system. The video preview may be used by the content provider to determine any discontinuities or other errors in transmission to the cloud. The video preview may have a lower bitrate than the original stream and may be sent to the content provider via a browser-based peer-to-peer video conferencing standard for display. The media streaming system may also send the content provider one or more metrics associated with a video stream, e.g., metrics relating to ingestion of the stream in the cloud such as packet loss metrics or other quality of service (QoS) metrics. The content provider may use the metrics to diagnose problems with the uploading and/or adjust parameters of the encoding or transmission of the stream. Using the techniques described herein, a media streaming system with a live video previewer may enable content providers to determine the quality of uploaded media streams easily and in substantially real-time.

As one skilled in the art will appreciate in light of this disclosure, embodiments may be capable of achieving certain technical advantages, including some or all of the following: (1) improved ability to diagnose problems in transmission of streaming video from a content provider to a cloud-based video ingestion and delivery system; (2) improved speed of problem diagnosis by providing a video preview and metrics in substantially real-time; (3) improved use of network bandwidth by delivering a lower-bitrate video preview rather than the higher-bitrate original; (4) improved use of network bandwidth for ingestion metrics sent over a network; (5) simplified deployment of live video previewing by using existing browser video conferencing functionality such as WebRTC; (6) improved encoding of video based on real-time metrics for video ingestion; and so on.

FIG. 1 illustrates an example system environment for live previewing of streaming video in the cloud, according to one embodiment. A media streaming system 100 may implement a media delivery pipeline to stream media, such as digital video or audio or a combination thereof, to destinations such as consumer computing devices 190 for further processing and/or playback using those devices. The media may represent live media content (e.g., a live stream associated with a particular channel or event) or prerecorded media content (e.g., a media asset from a library of streamable media). The pipeline may also include multiple stages; the stages may represent various transformations of the media and/or various distribution paths for the media (e.g., from device to device over the internet). A media stream may comprise a multichannel media stream in which multiple channels of content are packaged together. The multiple channels may typically represent different content, and a recipient may select one of the channels from the multichannel stream (e.g., for viewing). Alternatively, a media stream may comprise a single channel of media. Video and audio may be combined in a particular stream of media, potentially with other data such as captioning data.

In one embodiment, a content provider 110, using one or more client computing devices, may upload a media stream 120 to the media streaming system 100. The client device(s) may be remote from the one or more data centers used to implement the media streaming system 100, and the stream 120 may be sent via a network 105. The network 105 may comprise a publicly accessible network. For example, at least part of the network 105 used for transmission of the stream 120 may represent the Internet. The stream 120 may be transmitted over the network 105 using Internet Protocol (IP)-based transmission. At one or more stages of a media delivery pipeline of the media streaming system 100, a component for streaming video preview generation 135 may generate a video preview of the content provider's media and send that preview back to the content provider. For example, a pipeline stage 130 may implement ingestion of a video stream 120 from the content provider 110 and may send the provider a real-time video preview of the stream. In various embodiments, the video preview may be sent to the content provider over the same network as the incoming stream 120 or using a different network. The provider 110 may monitor the video preview using a preview display 115, e.g., in order to visually detect gaps in the uploading of the stream, visual artifacts introduced by a suboptimal connection, and other problems. In one embodiment, the video previewing may be used to isolate a point of failure in the pipeline with respect to a particular stream 120, e.g., if the preview cannot be provided at a certain stage. In one embodiment, the video previewing may be used by the content provider to determine whether the ground-to-cloud signal is sufficiently good before the content provider begins paying for delivery of the signal to consumers.

The video previewing may be referred to as being "live" or in "real-time" in that the preview of an earlier portion of the stream may be streamed back to the content provider 110 while a latter portion the original stream is being uploaded to the system 100. The latter portion of the stream may also be previewed; the video previewing may represent an ongoing process. Both the original stream 120 and the video preview may include video with multiple frames per second. In one embodiment, a delay between the ingestion of a frame by the system 100 and the previewing of that frame by the content provider 110 may be a matter of seconds or even less than a second. In one embodiment, the live and/or real-time nature of the video preview generator 135 and preview display 115 may permit the content provider 110 to detect and potentially fix errors in transmission before the stream has ended. In one embodiment, the video previewing may be initiated based (at least in part) on a request from the content provider 110, e.g., using a console displayed on a computing device operated by the content provider. In one embodiment, the video previewing may be terminated based (at least in part) on a request from the content provider 110 or on termination of the uploading of the stream.

The uploaded stream 120 may be transformed through multiple stages of a media delivery pipeline. For example, the stream 120 may be transformed into a stream 121 by a pipeline stage 130, and the stream 121 may be transformed into a stream 122 by a downstream pipeline stage 150. The stream 122 may then be delivered to consumers 190. The consumer computing devices 190 may be associated with and/or operated by one or more clients of the media streaming system 100; as used herein, the terms "consumer computing device," "consumer device," and "consumer" may be used interchangeably. The consumer computing devices 190 may be coupled to portions of the media streaming system 100 via one or more networks, potentially including the Internet. A consumer may represent a customer (e.g., an individual or group) of the media streaming system 100. Typically, a user associated with one of the consumer computing devices 190 may have an account that has privileges to access media content provided by the media streaming system 100. The access may be fee-based or may instead be free to the user (potentially with advertisements in the streaming media or player software). However, some media may also be streamable to users without accounts or other arrangements, e.g., on websites that provide streaming video.

It is contemplated that the media delivery pipeline implemented by the media streaming system 100 may include various combinations of pipelines, stages, or other components, including the particular combination illustrated in FIG. 1 for purposes of example. In one embodiment, the media streaming system 100 may use these various pipelines, stages, or other components to implement operations such as acquisition, frame synchronization, encoding, packaging, and distribution of streaming media. In one embodiment, as shown in FIG. 1, the media streaming system 100 may implement one pipeline stage 130, a downstream pipeline stage 150, and potentially one or more intermediate pipeline stages between stages 130 and 150. Stage 130 may represent an ingestion or acquisition stage in which media is obtained from a content provider 110. An input portion of the pipeline, such as stage 130, may implement operations such as acquisition, demultiplexing (demuxing), and/or decoding of media. At the acquisition stage, a signal representing the media may be acquired from one or more content providers, e.g., broadcasters. The signal may be acquired by the media streaming system 100 using any of several suitable transport mechanisms, including a serial digital interface (SDI), a camera feed, a microphone feed, an internet protocol (IP) connection, an asynchronous serial interface (ASI) connection, and so on. As acquired, the media may include components such as video, audio, captions, and other metadata, and demultiplexing may partition the media into those constituent elements. Demultiplexing may also include partitioning a multichannel stream into individual channels. Additionally, the input portion of the pipeline may perform decoding of the video and/or audio components of the acquired media. The decoding may transform the video and/or audio from one form to another, e.g., into a form that is usable by downstream components in an output portion of the pipeline.

The output portion of the pipeline may implement operations such as encoding, multiplexing (muxing), deinterlacing, frame rate conversion, application of graphics, scaling, watermarking, caption burn-in, and/or packaging of media. At the encoding stage, the media may be transformed into a particular video or audio format, e.g., using a particular codec. The encoding stage may be implemented by a plurality of components, referred to herein as encoders, that may operate in parallel. The encoding may also process audio and video separately. The encoders may differ in terms of the encoding tasks they perform. The encoding stage may include compression, or a separate compression stage may be used in the pipeline. Additionally, at the encoding stage, the media may be divided into segments or chunks of a fixed or variable size. For example, the media may be divided into segments of approximately ten seconds in length for delivery via HTTP over TCP/IP.

Downstream from the encoding stage, the video outputs may be processed further and distributed to one or more consumers 190. At a packaging stage, potentially within the output pipeline, the media may be packaged and multiplexed (or "muxed") for playback on particular playback software (referred to herein as a "player") and/or a particular type of computing device (e.g., a particular category of smartphone, a particular set-top box, a particular smart television, etc.). Multiplexing may include combining different components such as video, audio, captions, and metadata into a single data file or stream. In one embodiment, additional stages or sub-stages of the pipeline may perform additional transformations of the media, such as encryption performed at an encryption stage, scaling performed at a scaling stage, advertisement insertion performed at an advertisement insertion stage, and/or other types of image processing (e.g., color transformation) performed at an image processing stage. Alternatively, one of the additional transformations may be performed as a sub-stage of another stage such as the encoding stage. In some embodiments, the output portion of the pipeline may replicate and pass elements to multiple outputs, each with its own encoder, to produce adaptive bitrate outputs.

In one embodiment, the media streaming system 100 may include distribution components such as one or more origin servers and a plurality of content delivery network (CDN) servers 180. The origin server(s) may act as distribution points to the CDN servers. The CDN servers may be located closer to consumers in terms of geography and/or network latency in order to provide efficient distribution of the media. A single origin server may provide a media stream to many CDN servers, and each CDN server may then respond to requests for media from many consumer devices. In some cases, such as for prerecorded media, the origin server may persistently store the media (or segments thereof) for an indefinite period of time, while the CDN servers may cache segments of the media for a more limited period of time. If a consumer requests particular content that is not available in the cache at a CDN server, then the CDN server may request the content from the origin server and then deliver the content to the requesting consumer. Media may be sent from the origin server to one or more CDN servers. If other stages such as acquisition, encoding, and/or packaging are performed at the origin server, then the origin stage may include those stages or include corresponding sub-stages. However, it is also contemplated that the origin server stage may represent a distinct stage relative to the acquisition stage, encoding stage, and/or packaging stage. At the CDN stage 180, the media may be sent from CDN servers to consumer devices 190, e.g., as requested by the consumer devices. In one embodiment, the stages may also include a playback stage that represents attempted playback by a player (e.g., implemented in player software) on a consumer device 190.

In some embodiments, components of the media streaming system 100 such as servers, storage resources, and network resources may be implemented using resources of a provider network. The provider network may be set up by an entity such as a company or a public sector organization to provide one or more services (such as various types of cloud-based computing or storage) accessible via the Internet and/or other networks to clients. The provider network may include numerous data centers hosting various resource pools, such as collections of physical and/or virtualized computer servers, storage devices, networking equipment and the like (e.g., implemented using the example computing system 1000 described below with regard to FIG. 10), needed to implement and distribute the infrastructure and services offered by the provider network. In some embodiments, the provider network may provide computing resources and services, such as services associated with the media streaming system 100; storage services, such as a block-based storage service, key-value based data stores, or various types of database systems; and/or any other type of network-based services. Clients may access these various services offered by provider network 100 via one or more networks, potentially including the Internet. Likewise, network-based services may themselves communicate and/or make use of one another to provide different services. For example, computing resources offered in units called "instances," such as virtual or physical compute instances or storage instances, may make use of particular data volumes, providing virtual block storage for the compute instances.

The provider network may implement or provide a multi-tenant environment such that multiple clients (e.g., content providers 110 and/or consumer 190) may access or use a particular resource or service in a substantially simultaneous manner. Functionality of all or part of the media streaming system 100, such as the video preview generator 135, may be offered to multiple clients (in a substantially simultaneous manner) in such a multi-tenant provider network, such that the same computational and storage resources associated with the media streaming system may be used on behalf of different clients over the same window of time. The different clients may represent different individuals and/or different organizations that may pay the provider network for access to one or more services and/or resources. The provider network may include a fleet of computing devices, also referred to herein as servers, hosts, or instances, which are configured to execute software on behalf of clients of the provider network. In one embodiment, a fleet of servers may grow or shrink as individual servers are provisioned or deprovisioned using resources of the provider network. In one embodiment, the fleet of servers may grow or shrink as individual servers are added to or removed from a dedicated fleet by an administrator.

Content providers may represent individuals or entities who provide streaming media content to the media streaming system 100 for potential delivery to the consumers 190. The content provider 110 as illustrated in FIG. 1 may correspond to one or more computing devices that are connected to the media streaming system 100 over one or more networks 105, potentially including the Internet. The computing devices associated with the content provider 110 may encompass any type of hardware and software that are configurable to submit requests to the media streaming system 100 (e.g., implemented using the example computing system 1000 described below with regard to FIG. 10). Similarly, the computing devices associated with the consumers 190 may encompass any type of hardware and software that are configurable to consume streaming media provided by the media streaming system 100 (e.g., implemented using the example computing system 1000 described below with regard to FIG. 10). For example, a consumer device may include a dedicated media player, a suitable version of a web browser, and/or a plug-in module or other type of code module configured to execute as an extension to or within an execution environment provided by a web browser or other form of client software. In some embodiments, such a client application may include sufficient protocol support (e.g., for a suitable version of Hypertext Transfer Protocol [HTTP]) for generating and processing network-based service requests.

Content providers and/or consumer devices 190 may convey network-based requests to the media streaming system 100 via one or more external networks. In various embodiments, the external network(s) may encompass any suitable combination of networking hardware and protocols necessary to establish network-based communications between computing devices and the media streaming system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given computing device and the media streaming system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given computing device and the Internet as well as between the Internet and the media streaming system 100. It is noted that in some embodiments, computing devices for content providers and/or consumers 190 may communicate with the media streaming system 100 using a private network in addition to or instead of the public Internet.

Figure 10:
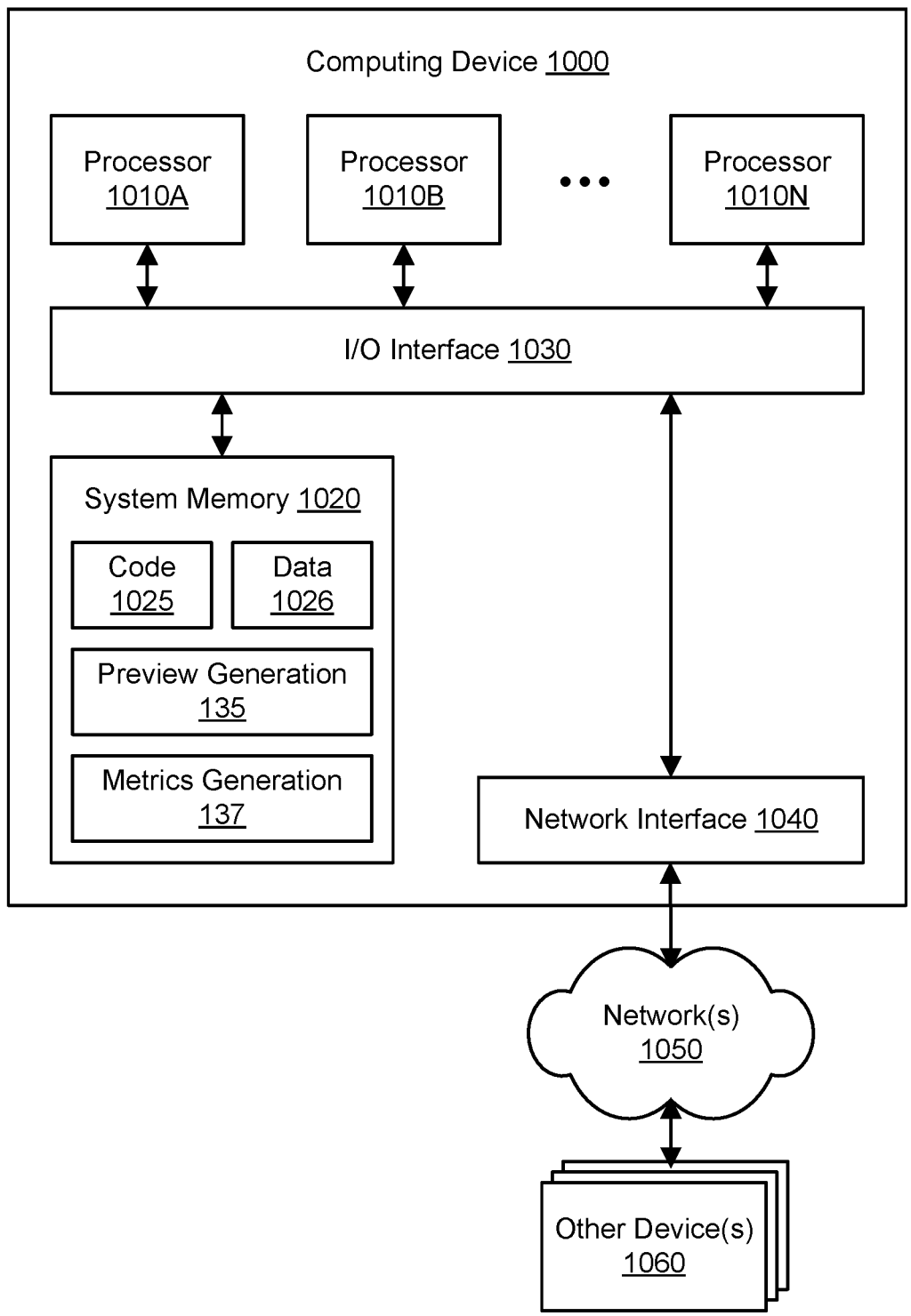
FIG. 10 illustrates an example computing device that may be used in some embodiments.

The media streaming system 100 may include a plurality of computing devices, any of which may be implemented by the example computing device 1000 illustrated in FIG. 10. In various embodiments, portions of the described functionality of the media streaming system 100 may be provided by the same computing device or by any suitable number of different computing devices. If any of the components of the media streaming system 100 are implemented using different computing devices, then the components and their respective computing devices may be communicatively coupled, e.g., via a network. Each of the illustrated components (such as the pipeline stages 130 through 150) may represent any combination of software and hardware usable to perform their respective functions. Multiple computing devices may typically be used to implement the multi-stage pipeline. In some circumstances, more than one stage may be performed by the same computing device.

It is contemplated that the media streaming system 100 may include additional components not shown, fewer components than shown, or different combinations, configurations, or quantities of the components shown. For example, although various components such as the pipeline stages 130 through 150 are shown for purposes of example and illustration, it is contemplated that different quantities and configurations of components may be used. Aspects of the functionality described herein may be performed, at least in part, by components outside of the media streaming system 100. Additionally, it is contemplated that some of the illustrated stages may include redundant components that collectively provide the functionality of a particular stage. The redundancy of components may permit the pipeline to be rerouted to bypass a problematic component in a particular stage. In one embodiment, the media streaming system 100 may be divided into multiple regions representing different zones within a provider network whose resources are used to implement the media streaming system 100. The different regions may represent geographical divisions of underlying components, including different nations, states, political subdivisions, continents, arbitrary zones, or data centers. Each of the regions may implement a media delivery pipeline with multiple stages. Within each region, a particular stage may be implemented with redundancy.

Figure 2:
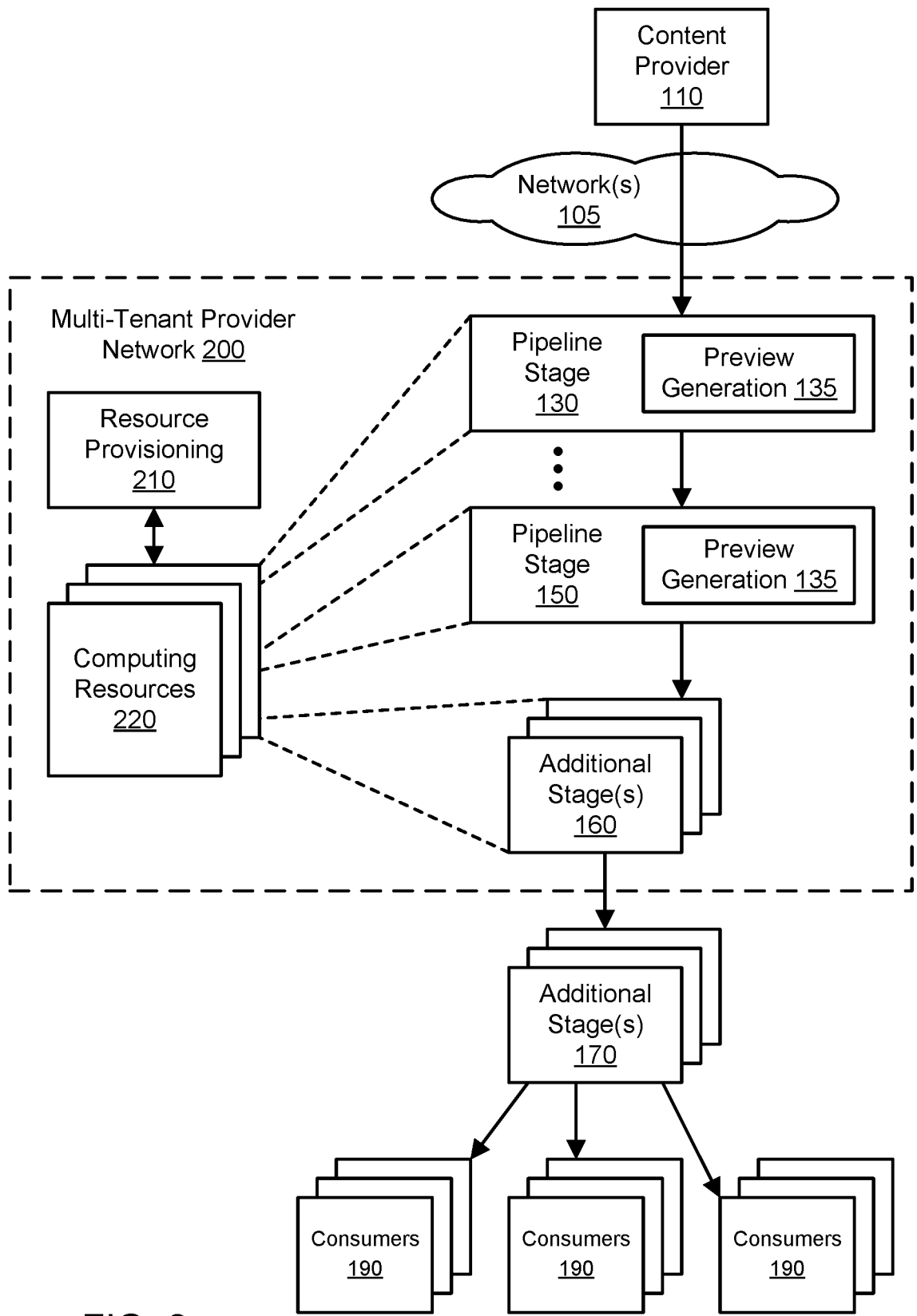
FIG. 2 illustrates further aspects of the example system environment for live previewing of streaming video in the cloud, including the use of a multi-tenant provider network to host video ingestion and preview generation in the cloud, according to one embodiment.

FIG. 2 illustrates further aspects of the example system environment for live previewing of streaming video in the cloud, including the use of a multi-tenant provider network to host video ingestion and preview generation in the cloud, according to one embodiment. As discussed above with respect to FIG. 1, the media streaming system 100 may be implemented using one or more computing resources, such as virtual compute instances or physical compute instances, that are provisioned from a provider network 200. In one embodiment, different components (including redundant components within a stage) of the media streaming system 100 may be implemented using different compute instances. The provider network 200 may offer multi-tenancy such that computing resources from a pool 220 may be shared by multiple clients of the provider network at any given time. The computing resources 220 may include compute instances, storage instances, database instances, and so on. A resource provisioning functionality 210 in the multi-tenant provider network 200 may provision and deprovision resources in the pool 220 on behalf of clients. A computing resource from the pool 220 may be provisioned by selecting any appropriate type of resource, making it available to a particular client at a particular time, and potentially configuring the resource (e.g., with operating system software for a compute instance) to meet the requirements of the client. The client may then operate the provisioned resource based on the client's agreement with the provider network, e.g., on an hourly basis for a fee. When a resource is deprovisioned and returned to the pool 220 of available resources, another client may then provision and use that resource.

Various components of the media streaming system 100, such as the pipeline stage 130 (including video preview generator 135) and pipeline stage 150 (including video preview generator 135), may be provisioned using resources of the provider network 200. As shown in the example of FIG. 2, one or more additional pipeline stages 160 may be implemented using the resources of the provider network 200, while one or more other pipeline stages 170 may be implemented outside of the provider network. For example, packagers in a packaging stage may be implemented inside the provider network 200, while origin servers and content delivery network (CDN) servers may be implemented outside the provider network.

Figure 3:
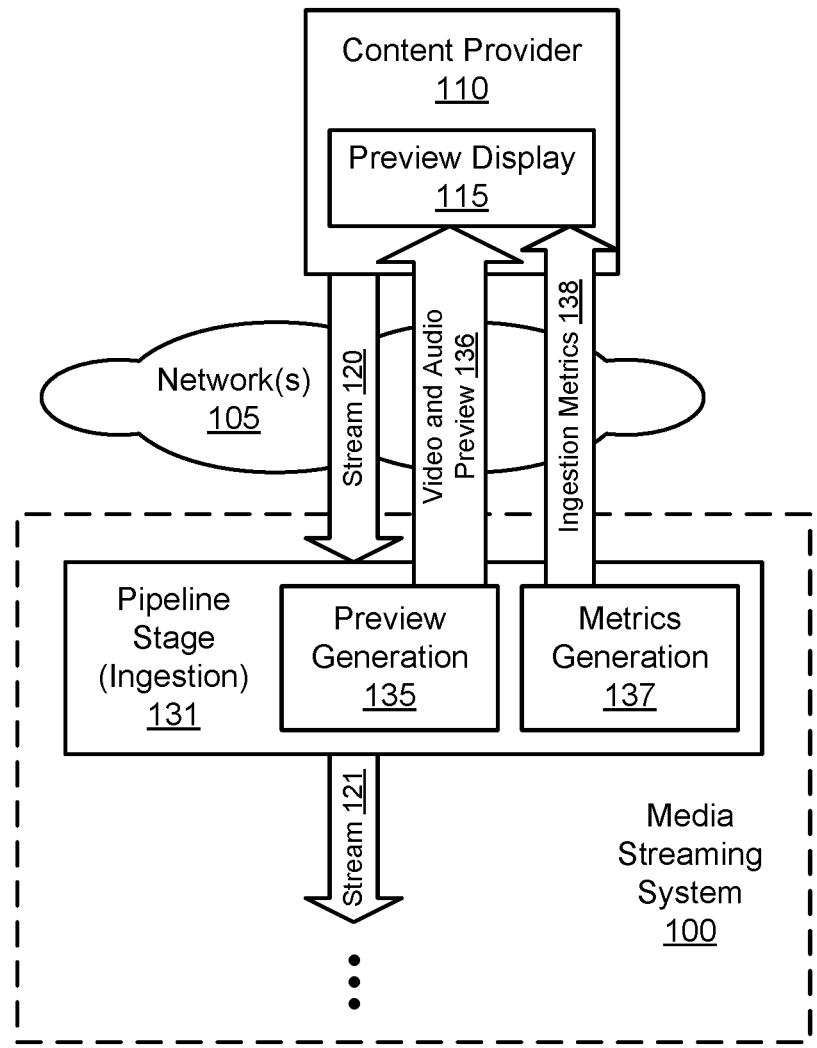
FIG. 3 illustrates further aspects of the example system environment for live previewing of streaming video in the cloud, including sending a video preview with audio and metrics to the content provider, according to one embodiment.

FIG. 3 illustrates further aspects of the example system environment for live previewing of streaming video in the cloud, including sending a video preview with audio and metrics to the content provider, according to one embodiment. A pipeline stage 131 of the media streaming system may perform ingestion of media content from content providers. The pipeline stage 131 may occur relatively early in the pipeline, e.g., as the initial stage. The pipeline stage 131 may be augmented with the component for preview generation 135. The preview generation component 135 may produce a video stream that represents a version of the incoming video stream 120. The video preview 136 may be streamed to the content provider and displayed via a preview display 115 using a video conferencing technology. In one embodiment, a web browser or other software operated by the content provider 110 may include a video conferencing functionality. The video conferencing functionality may permit the transmission of low latency but full framerate video from the cloud to the content provider 110. Using the video conferencing functionality, the video preview and metrics may be "pushed" to the content provider rather than "pulled" by requests from the content provider. In one embodiment, the video conferencing functionality may be built into the browser, e.g., using the WebRTC standard. In one embodiment, the video conferencing functionality may be added to the browser using a plug-in. In one embodiment, the video conferencing functionality may be part of software other than browser software but operable on a computing device associated with the content provider 110. The preview generation component 135 or another component of the media streaming system 100 may establish a peer-to-peer connection with the browser, console, or other client-side software that implements the preview display 115 at the content provider 110. The peer-to-peer connection may then be used for efficient transmission of the video (and audio) preview 136 to the content provider 110. Use of the peer-to-peer connection may bypass origin servers, content delivery (CDN) servers, and/or other intermediaries in order to achieve lower-latency transmission of a preview video.

The preview 136 may include both video and synchronized audio, if audio was originally present in the incoming stream 120. The preview video 136 may include multiple frames per second. In one embodiment, due to the teleconferencing-specific nature of the preview display 115, the preview 136 may represent a lower quality than the original stream 120 while still permitting the content provider 110 to detect problems in transmission or ingestion. The preview 135 may have a lower bitrate than the original stream 120. In one embodiment, the preview 136 may have a lower resolution than the original stream 120. In one embodiment, the preview 136 may have a lower framerate than the original stream 120.

The pipeline stage 131 may also be augmented with a component for metrics generation 137. The metrics generation 137 may generate one or more metrics 138 associated with transmission of the stream 120, ingestion of the stream by the media streaming system 100, the quality of the stream, and so on. For example, one or more of the metrics 138 may indicate a degree of packet loss in the transmission of the stream 120 from the content provider 110 to the pipeline stage 131. As another example, one or more of the metrics 138 may indicate a packet recovery rate of packets recovered using forward error correction (FEC) or content-aware automatic repeat request (ARQ) packet loss recovery. As yet another example, one or more of the metrics 138 may indicate QoS alarms that identify issues with the transport stream timing. The metric(s) 138 may be sent back to the content provider 110. In one embodiment, the metric(s) 138 may be sent in a data channel of the peer connection over which the video preview 136 is sent. In one embodiment, the metrics may be generated on a finer-grained basis than the preview video. For example, metrics may be generated for one or more packets while the preview may be generated frame-by-frame, where a frame of the ingested video corresponds to many packets received by the pipeline stage 131. In various embodiments, the video preview 136 and metrics 138 may be sent to the content provider over the same network as the incoming stream 120 or using a different network. For example, the incoming stream 120 may be transmitted via the public Internet, and the video preview 136 and metrics 138 may be transmitted via a private network to a console within the same provider network 200 as the media streaming system 100.

In one embodiment, the metric(s) 138 may be displayed in substantially real-time, e.g., along with the corresponding frames or other media elements of the preview display 115. In one embodiment, the metric(s) 138 may be used at the content provider to detect or diagnose problems with transmission or ingestion of the stream 120. For example, if the metric(s) 138 indicate a high degree of packet loss, then the content provider 110 may reduce the bitrate of the stream 120. The content provider 110 may then monitor the subsequent elements of the preview 136 and/or metric(s) 138 to see whether the problem has been mitigated. As another example, the content provider 110 may change the FEC parameter dimensions at the source to accommodate burst errors as opposed to random errors. As yet another example, the content provider 110 may address QoS alarms by changing settings in the ground encoder or addressing latency issues in the initial network. In this manner, the preview 136 and/or metric(s) 138 may be used to implement a feedback loop in substantially real-time.

In one embodiment, both the preview generation 135 and metrics generation 137 may be implemented using the same service or subsystem. In one embodiment, another instance of service or subsystem that implements preview generation 135 and metrics generation 137 may be added to additional (downstream) stages of the pipeline. Using these components, one or more of the additional stages may provide video previews to the content provider 110 that represent the state of the stream upon entry to the corresponding stage. The metrics provided by the downstream stages may represent the quality of the stream as received by the stage, e.g., using packet loss metrics and/or QoS metrics. Different instances of the video preview generation 125 at different pipeline stages may establish different peer-to-peer video conferencing connections with the content provider 110. In one embodiment, a preview console at the content provider 110 may switch between different preview videos from different pipeline stages, e.g., based on user input.

Figure 4:
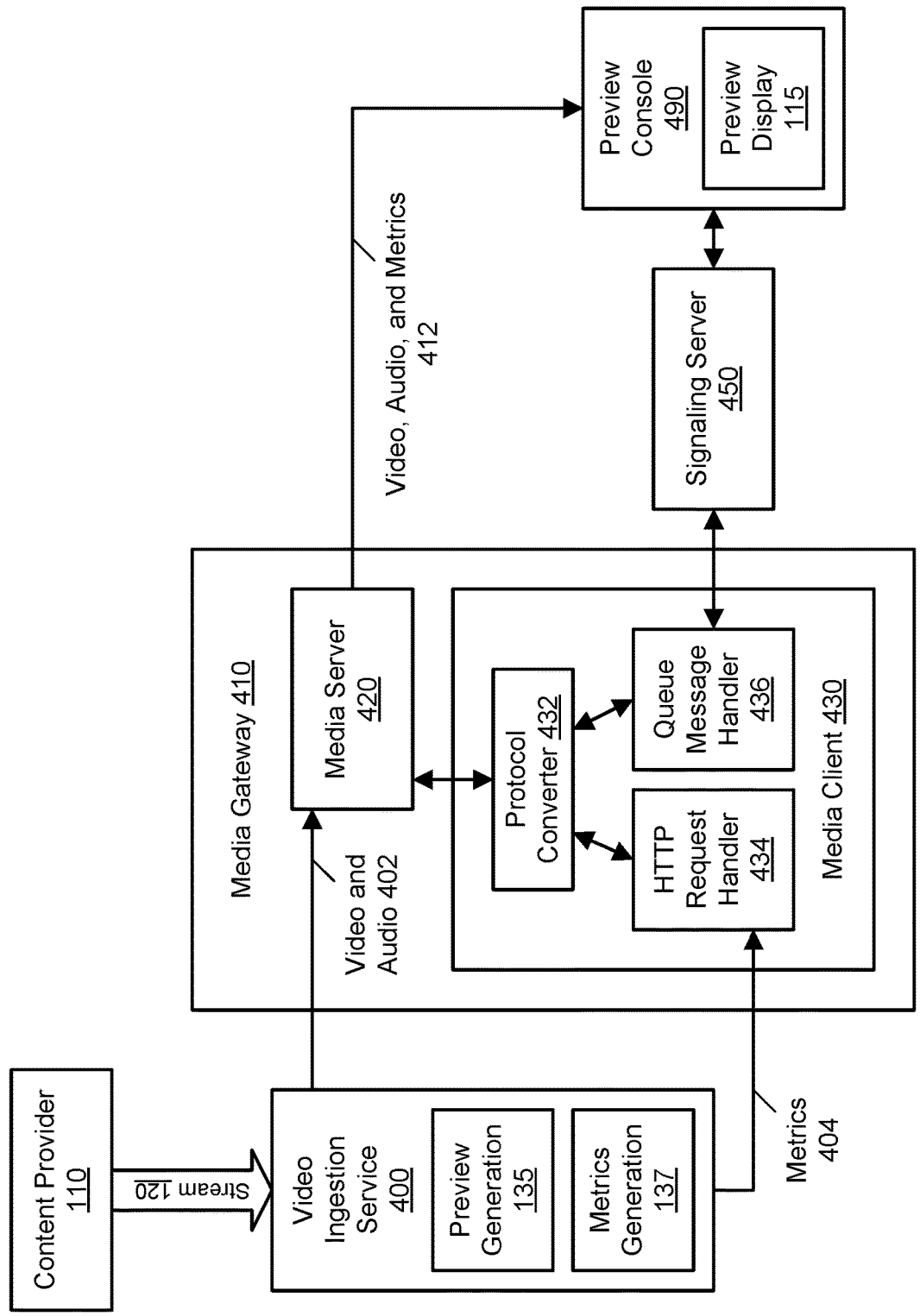
FIG. 4 illustrates further aspects of the example system environment for live previewing of streaming video in the cloud, including a signaling server that establishes a peer connection between a media gateway and a client-side preview console to which the media gateway sends a video preview and metrics, according to one embodiment.

FIG. 4 illustrates further aspects of the example system environment for live previewing of streaming video in the cloud, including a signaling server that establishes a peer connection between a media gateway and a client-side preview console to which the media gateway sends a video preview and metrics, according to one embodiment. A video ingestion service 400 may represent a stage of the media delivery pipeline, e.g., the ingestion stage 131. As discussed above, the preview generation component 135 may generate video and audio 402 of stream representing a lower-bitrate preview of the ingested stream 120. As also discussed above, the video ingestion service 400 may generate one or more metrics 404 associated with ingestion, e.g., packet loss metrics. Updated elements of the video and audio 402 and the metrics 404 may generated again and again as additional elements of the stream 120 (e.g., additional frames of video) are ingested. The ingestion service 400 may provide the video, audio, and metrics to a media gateway 410.

As discussed above, the video preview and metrics may be transmitted over a peer connection, e.g., using WebRTC or other video conferencing technology. As shown in FIG. 4, a media server 420 and a preview console 490 may represent the two peers in the connection. The preview console may be present on a client-side computing device operated by the content provider 110. A signaling server 450 may operate to establish the peer connection. In one embodiment, the signaling server 450 may be implemented using a serverless computation service that performs functions on behalf of a client without the client having responsibility for provisioning or managing servers. The signaling server 450 may use queues for the media gateway and the client to store messages between those two entities, and the queues may be managed using a queue service. A technique for establishing the peer connection is discussed below with respect to FIG. 6A and FIG. 6B. The media gateway 410 may include the media server 420 and a media client 430. The media client 430 may include a protocol converter 432, an HTTP request handler 434, and a queue message handler 436 that interacts with queues provided by a queue service.

In one embodiment, after the handshaking through the signaling server 450, the media gateway and the console client can communicate through a peer connection, which means that they can communicate with each other directly using their IP addresses and port numbers. In some embodiments, however, most devices are behind one or more layers of NAT (Network Address Translation), and some devices are behind proxies and corporate firewalls. The ICE (interactive connectivity establishment) framework may allow WebRTC to overcome such complexities of real-world networking. The ICE framework may find the best path to connect peers by trying all possibilities in parallel and choosing the most efficient path. ICE may try to make a connection using the host address obtained from a device's operating system and network card. In one embodiment, if the devices are not behind NATs, then this attempt will succeed. Otherwise, ICE may obtain an external address using a STUN (Session Traversal Utilities for NAT) server. If this attempt fails, ICE may route via a TURN (Traversal Using Relay NAT) server. In one embodiment, the STUN server is on the public internet. In one embodiment, the function of STUN server is to check the IP:port of an incoming request and send that address back in a response. An application running behind a NAT may make a request to a STUN server to discover its own IP:port from a public perspective. By doing this, one peer may get a publicly accessible address for itself and pass it to the other peer via signaling server, so that both peers can eventually know the other's address that can be used for communication directly. The fallback TURN server may relay data between endpoints, including streams and metrics data.

Figure 5:
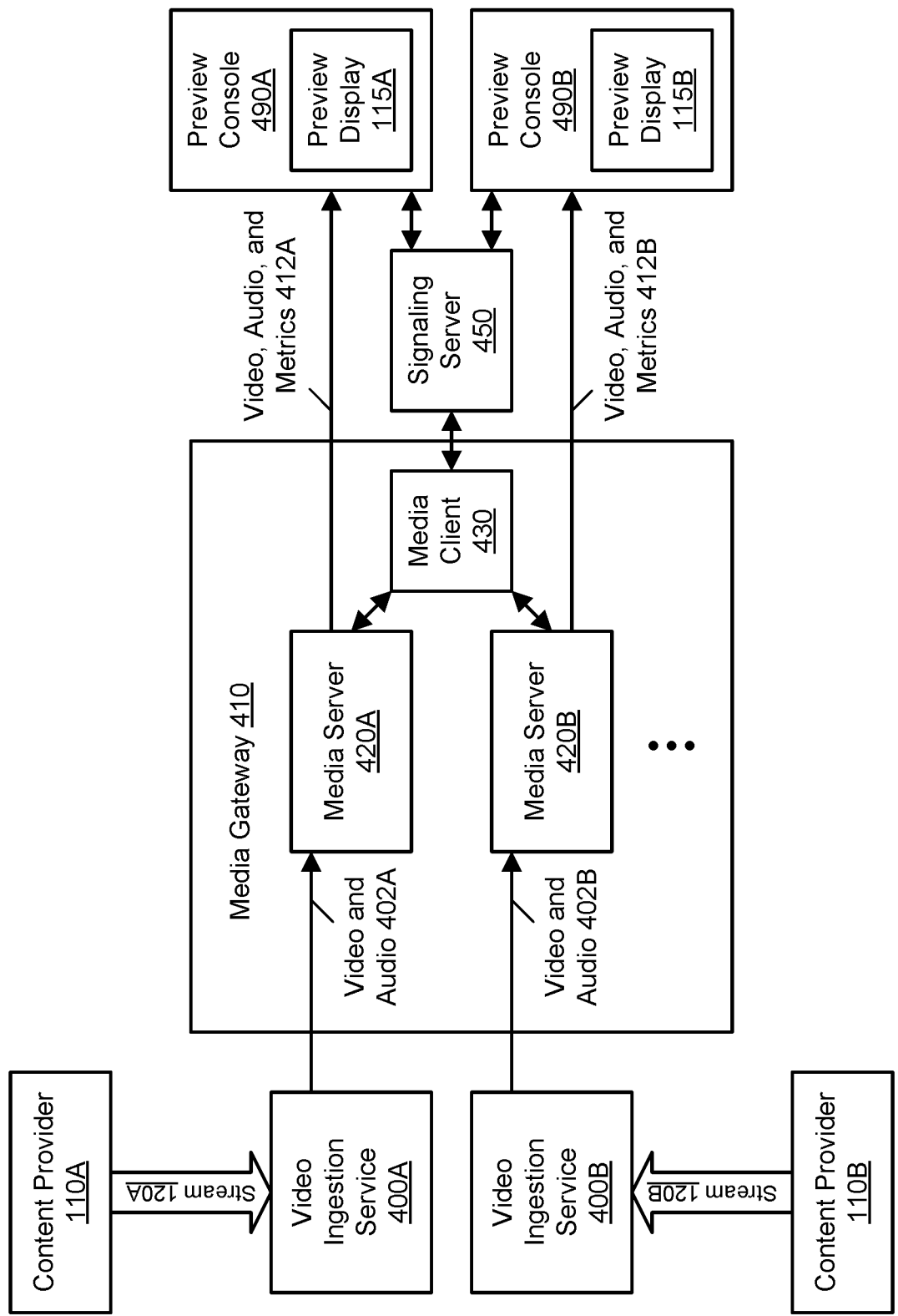
FIG. 5 illustrates further aspects of the example system environment for live previewing of streaming video in the cloud, including the use of multiple media servers with one media client, according to one embodiment.

FIG. 5 illustrates further aspects of the example system environment for live previewing of streaming video in the cloud, including the use of multiple media servers with one media client, according to one embodiment. As shown in FIG. 5, the same media gateway 410 and media client 430 may be used to handle video previewing for multiple streams to multiple preview consoles. A content provider 110A may send a stream 120A over the Internet to one instance or endpoint 400A of the video ingestion service. Similarly, another content provider 110B may send a stream 120B over the Internet to one instance or endpoint 400B of the video ingestion service. An instance of the media gateway 410 may include one media server for each stream, e.g., media server 420A for video and audio information 402A and media server 420B for video and audio information 402B. As discussed above with reference to FIG. 4, a signaling server 450 and media client 430 may be used to establish peer connections between the media servers and corresponding preview consoles 490A and 490B. After the connections are established, the media server 420A may send the preview video, audio, and metrics 412A to the preview console 490A for display on the preview display 115A, and the media server 420B may send the preview video, audio, and metrics 412B to the preview console 490B for display on the preview display 115B. The two previews 412A and 412B may be streamed in a substantially concurrent manner.

Figure 6A:
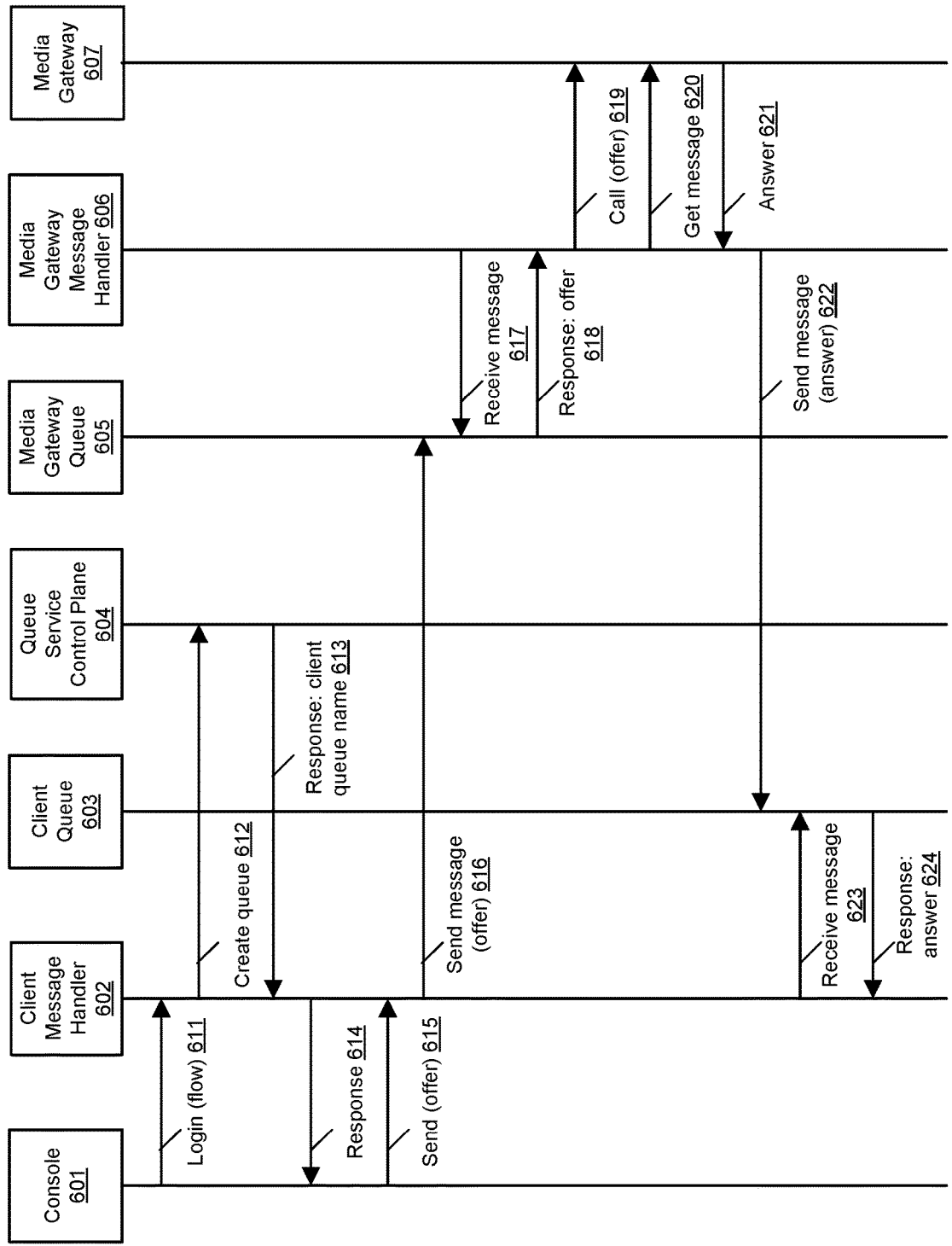
FIG. 6A and FIG. 6B illustrate a timing diagram for establishing a peer connection between a media gateway in the cloud and a client-side preview console, according to one embodiment.
Figure 6B:
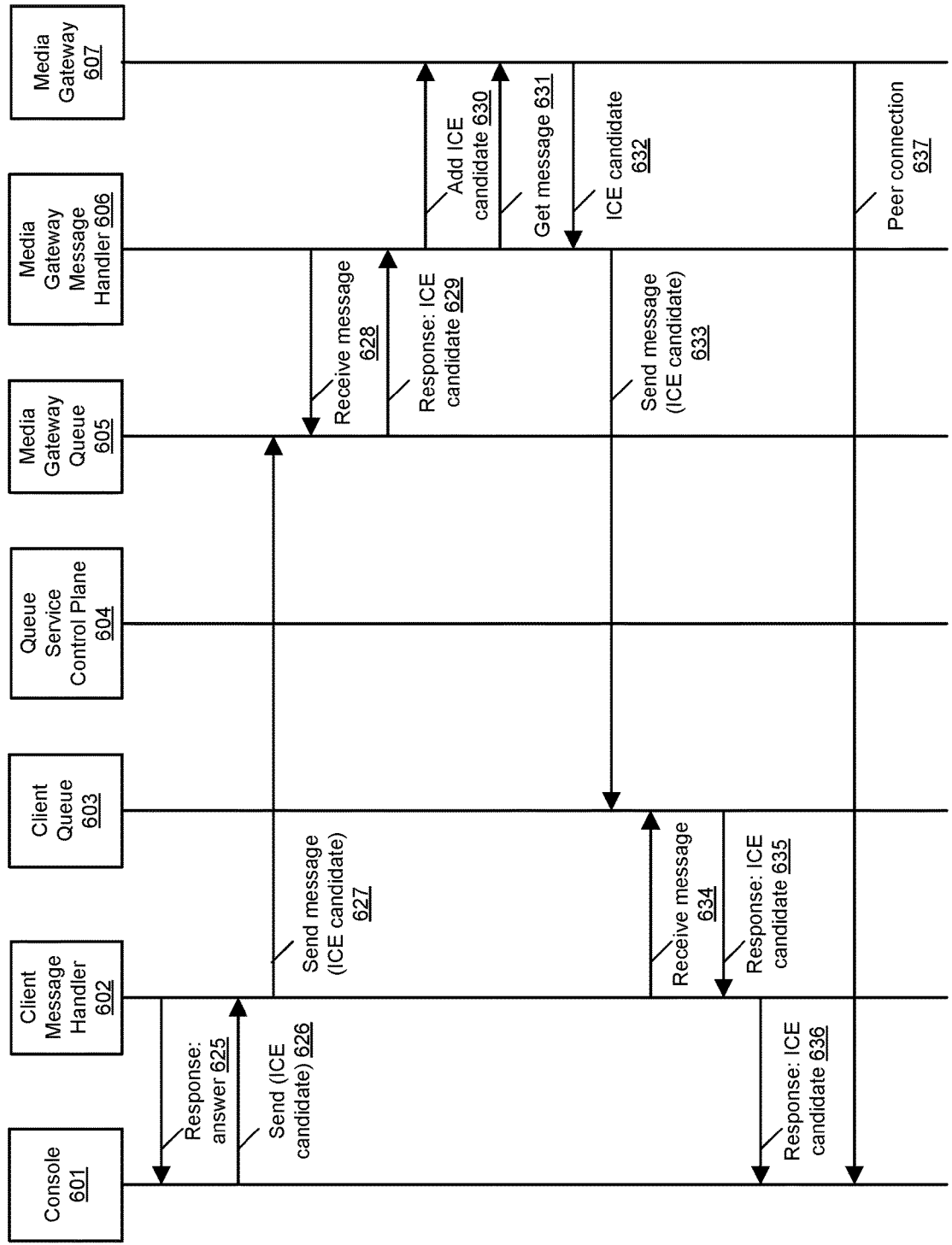

FIG. 6A and FIG. 6B are timing diagrams illustrating a technique for establishing a peer connection between a media gateway in the cloud and a client-side preview console, according to one embodiment. As shown in 611, the preview console 601 may request to login to a client message handler of the signaling server 450 and may supply an identifier of the flow to be previewed. The client message handler 602 may use the flow identifier to look up the media gateway queue name to which the flow is mapped. As shown in 612, the client message handler 602 may also create a client queue in the queue service control plane 604 and generate the credentials of a TURN server for this preview console. As shown in 613 and 614, the console 601 may receive a response indicating ICE server information, the media gateway queue name, and the client queue name. After this registration succeeds, as shown in 615 and 616, the console 601 may establish a video conferencing (e.g., WebRTC) connection to the appropriate media gateway 607 by calling the send function in the client message handler to enqueue the session description protocol (SDP) and interactive connectivity establishment (ICE) information to the media gateway queue 605. As shown in 617, 618, 619, and 620, the media gateway message handler 606 may then dequeue the message from the media gateway queue 605 and pass it to the media gateway 607. As shown in 621 and 622, the media gateway message handler 606 may also get response messages from the media gateway and enqueue them to the appropriate client queue 603; these messages can be dequeued if the console calls the receive function in the client message handler as shown in 623 and 624. After similarly exchanging SDP/ICE messages as shown in 625, 626, 627 628, 629, 630, 631, 632 633, 634, 635, and 636, then as shown in 637, the video conferencing (e.g., WebRTC) client in the preview console and the video conferencing (e.g., WebRTC) server in the media gateway may start a peer connection for transmission of the preview video, audio, and metrics 412 to the preview console for display using the preview display 115.

Figure 7:
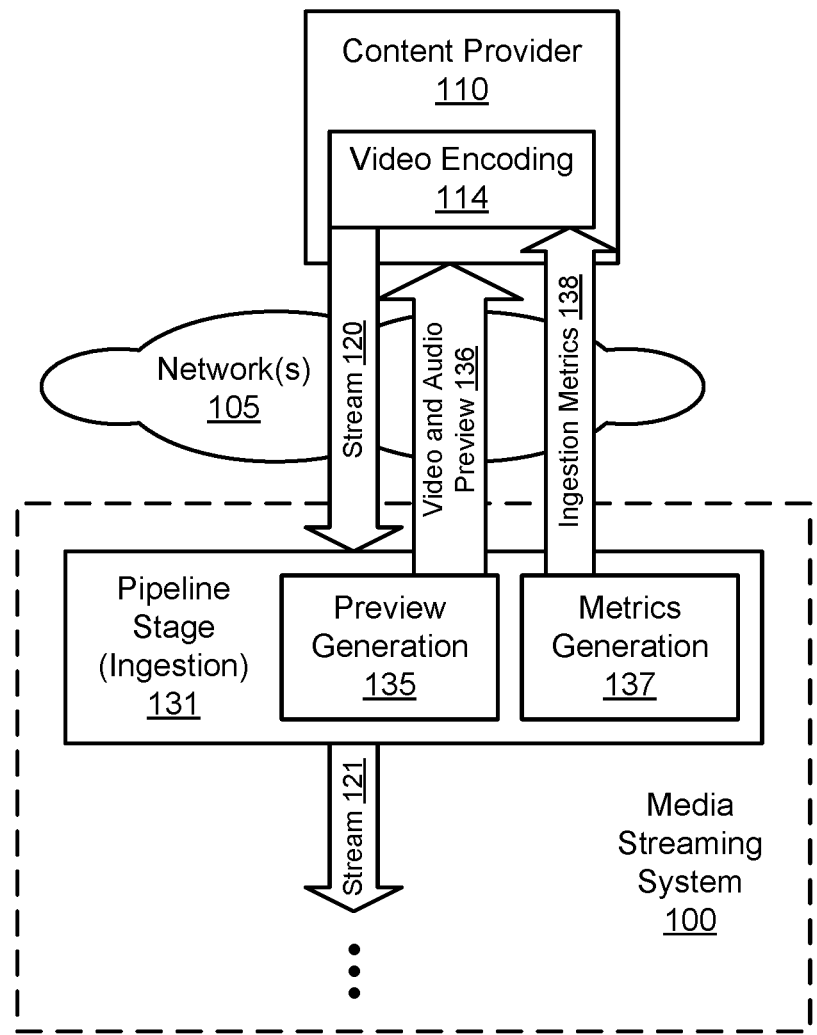
FIG. 7 illustrates further aspects of the example system environment for live previewing of streaming video in the cloud, including automated adjustment of video encoding at the content provider based (at least in part) on metrics provided by the cloud-based ingestion system, according to one embodiment.

FIG. 7 illustrates further aspects of the example system environment for live previewing of streaming video in the cloud, including automated adjustment of video encoding at the content provider based (at least in part) on metrics provided by the cloud-based ingestion system, according to one embodiment. As discussed above, a pipeline stage 131 may also be augmented with a component for metrics generation 137. In one embodiment, the metric(s) 138 may be used at the content provider to detect or diagnose problems with transmission or ingestion of the stream 120. In one embodiment, the metric(s) 138 may be used to adjust the video encoding 114 of subsequent portions of the stream 120. For example, if the metric(s) 138 indicate a high degree of packet loss, then the content provider 110 may reduce the bitrate of the stream 120 generated by the video encoding component 114. In one embodiment, the adjustment of the video encoding 114 based (at least in part) on the metric(s) 138 may be performed automatically and programmatically, e.g., according to predefined rules and without direct user input. An individual or automated system at the content provider 110 may then monitor the subsequent elements of the preview 136 and/or metric(s) 138 to see whether the problem has been mitigated. In this manner, the preview 136 and/or metric(s) 138 may be used to implement an automated feedback loop in substantially real-time.

Figure 8:
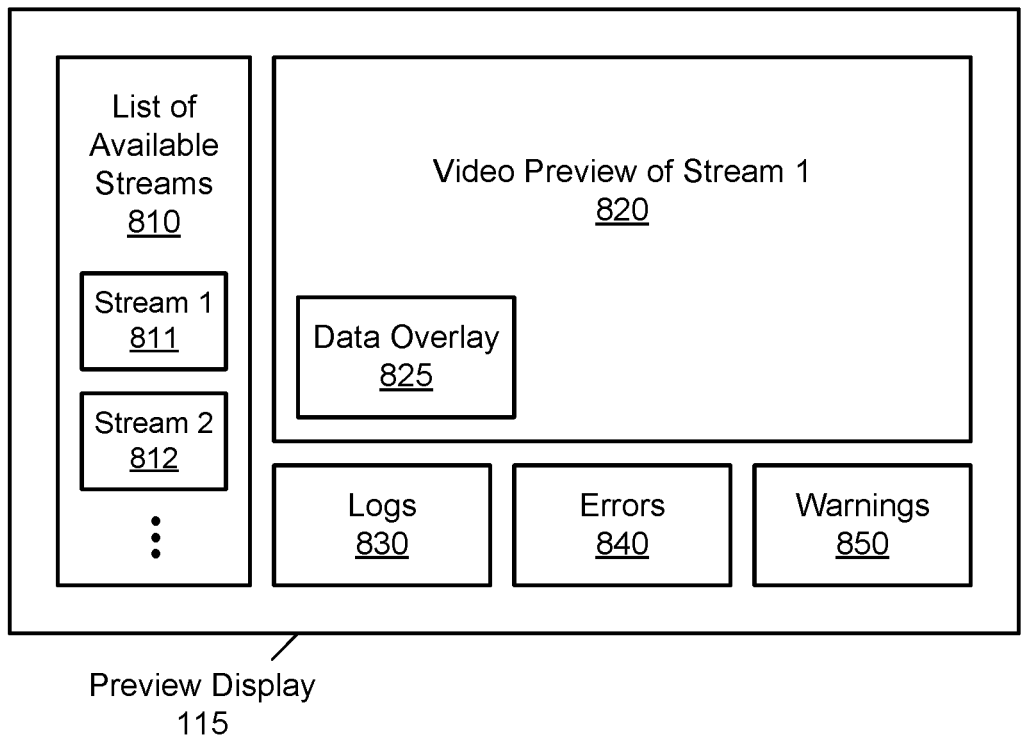
FIG. 8 illustrates an example client display for live previewing of streaming video uploaded to the cloud, according to one embodiment.

FIG. 8 illustrates an example client display for live previewing of streaming video uploaded to the cloud, according to one embodiment. In some embodiments, the preview display 115 may present several elements associated with a preview of the streaming media 120. As discussed above, the preview display 115 may include a region 820 for displaying the video preview of a particular stream. The video preview 820 may be updated automatically with newly received video information, e.g., to display the newest frames of the preview according to a particular framerate. In one embodiment, the video preview may also have a data overlay 825 for presentation of metadata and/or metrics 138 associated with the preview. In one embodiment, the preview display 115 may include a region 810 that lists available streams associated with the content provider 110. For example, the list 810 may indicate a first stream 811, a second stream 812, and so on. A user of the preview display 115 may select one of the listed streams, such as the first stream 811, in order to switch the video preview 820 to that stream.

In one embodiment, the preview display 115 may include a region 830 for log entries associated with the stream or its ingestion. In one embodiment, the preview display 115 may include a region 840 for errors associated with the stream or its ingestion. In one embodiment, the preview display 115 may include a region 850 for warnings associated with the stream or its ingestion. One or more of the elements 810-850 may be interactive, such that user interaction with an element via appropriate user input may further modify the preview display 115, e.g., to drill down or otherwise present additional information. By displaying these various elements in a single display or console accessible by the content provider 110, the media streaming system 100 may enable fast and efficient detection and diagnosis of problems with a video stream that is currently being uploaded to the cloud.

Figure 9:
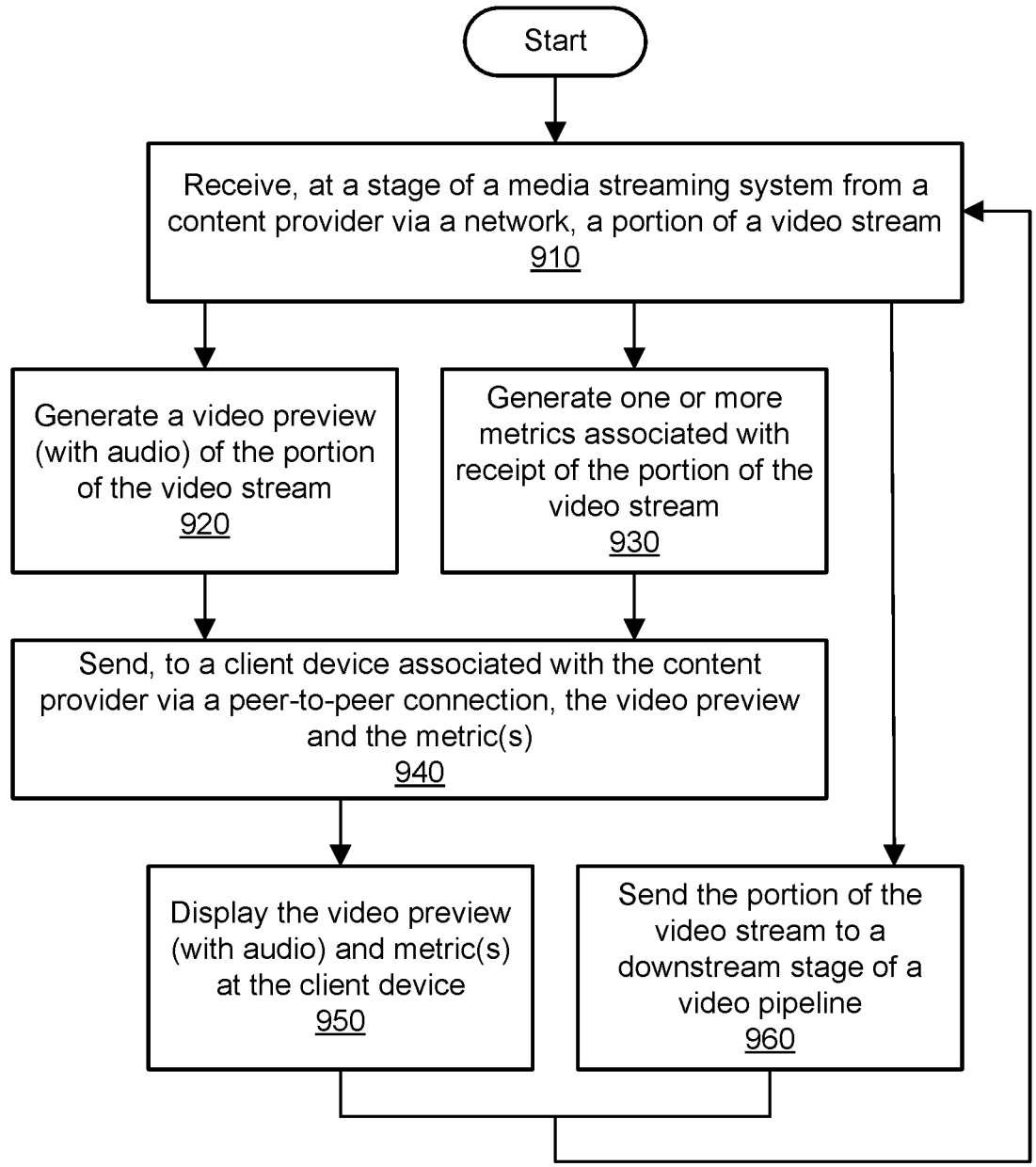
FIG. 9 is a flowchart illustrating a method for live previewing of streaming video in the cloud, according to one embodiment.

FIG. 9 is a flowchart illustrating a method for live previewing of streaming video in the cloud, according to one embodiment. As shown in 910, a portion of a video stream may be received at a cloud-based media streaming system from a content provider. The stream may represent an ongoing set of data. In one embodiment, the portion of the stream may include one or more frames or other media elements that represent a window of time within the stream. In one embodiment, the portion of the stream may include one or more network packets. The stream may include video and audio. The content provider may be external to a multi-tenant provider network that implements the media streaming system, and the stream may be uploaded to the media streaming system via a network. The network may represent a public network such as the Internet. The transmission path over the Internet may include a variety of components (e.g., routers) managed by different entities, and errors or gaps in transmission may be introduced in the uploading of the stream to the cloud. For example, packets may be dropped if the network infrastructure between the content provider and the cloud cannot support transmission of the stream at a particular bitrate.

In the cloud, the stream may be received at a particular stage of a media delivery pipeline (e.g., an ingestion stage), potentially transformed in some way, and then passed to other pipeline stages or content consumers. As shown in 920, the media streaming system may generate a video preview of the ingested portion of the stream. In one embodiment, the video preview may represent the same window of time within the stream as the ingested portion. In one embodiment, the preview may have a lower bitrate than the original. In one embodiment, the preview may include both video and audio.

As shown in 930, the media streaming system may generate one or more metrics associated with the ingested portion of the stream. The metric(s) may represent the quality of the transmission or ingestion of the portion of the stream. For example, the metric(s) may indicate a degree of packet loss of the portion of the stream, e.g., as a percentage of all of the packets of the portion. In one embodiment, the metric(s) may be generated at a more granular level (e.g., packet level) than the preview video.

As shown in 940, the media streaming system may send the video preview (with audio, if applicable) and the metric(s) to at least one computing device associated with the content provider. A device that receives the preview and metric(s) may be the same device or a different device than the device that uploaded the stream into the cloud. Again, the computing device of the content provider may be external to the multi-tenant provider network that implements the media streaming system, and the preview and metric(s) may be sent via a network such as the Internet or via a private network (e.g., within the provider network 200). In one embodiment, the preview and metric(s) may be transmitted over a peer-to-peer video conferencing connection between a component of the media streaming system and the device at the content provider.

As shown in 950, the video preview (with audio, if applicable) may be displayed on a display associated with the client device. The display may be part of or coupled to a computer, a smartphone, a tablet, a wearable device, a smart television, an Internet of Things (IoT) or home automation device, and so on. The display may be part of an administrative console associated with the content provider's account with the media streaming system. At least some of the metric(s) may also be displayed, e.g., along with corresponding elements of the video preview.

As shown in 960, the portion of the video stream may be sent to a downstream stage of a video pipeline. For example, the portion of the video stream may be sent to a downstream stage that performs encoding, multiplexing (muxing), deinterlacing, frame rate conversion, application of graphics, scaling, watermarking, caption burn-in, packaging, or other transformations. In various embodiments, the operation shown in 960 may be performed at other points in the method, e.g., after 920, 930, or 940, or in parallel with other operations in the method. In some embodiments, the operations shown in 920, 930, 940, and 950 may be performed again at one or more additional downstream stages of the media delivery pipeline.

Illustrative Computer System

In at least some embodiments, a computer system that implements a portion or all of one or more of the technologies described herein may include a computer system that includes or is configured to access one or more computer-readable media. FIG. 10 illustrates such a computing device 1000. In the illustrated embodiment, computing device 1000 includes one or more processors 1010A-1010N coupled to a system memory 1020 via an input/output (I/O) interface 1030. Computing device 1000 further includes a network interface 1040 coupled to I/O interface 1030.

In various embodiments, computing device 1000 may be a uniprocessor system including one processor or a multiprocessor system including several processors 1010A-1010N (e.g., two, four, eight, or another suitable number). Processors 1010A-1010N may include any suitable processors capable of executing instructions. For example, in various embodiments, processors 1010A-1010N may be processors implementing any of a variety of instruction set architectures (ISAs), such as the x86, PowerPC, SPARC, or MIPS ISAs, or any other suitable ISA. In multiprocessor systems, each of processors 1010A-1010N may commonly, but not necessarily, implement the same ISA.

System memory 1020 may be configured to store program instructions and data accessible by processor(s) 1010A-1010N. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code (i.e., program instructions) 1025 and data 1026. In one embodiment, as shown in FIG. 10, system memory 1020 stores program code and data that implement aspects of the component 135 for video preview generation. In one embodiment, as shown in FIG. 10, system memory 1020 stores program code and data that implement aspects of the component 137 for metrics generation.

In one embodiment, I/O interface 1030 may be configured to coordinate I/O traffic between processors 1010A-1010N, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processors 1010A-1010N). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processors 1010A-1010N.

Network interface 1040 may be configured to allow data to be exchanged between computing device 1000 and other devices 1060 attached to a network or networks 1050. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of at least one computer-readable (i.e., computer-accessible) medium configured to store program instructions and data as described above for implementing embodiments of the corresponding methods and apparatus. For example, system memory 1020 may store program code and data associated with the streaming video preview generation 135 and/or metrics generation 137. In some embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 1000 as system memory 1020 or another type of memory. Further, a computer-readable medium may include transmission media or signals such as electrical, electromagnetic, or digital signals, conveyed via a communication medium such as a network and/or a wireless link, such as may be implemented via network interface 1040. The described functionality may be implemented using one or more non-transitory computer-readable storage media storing program instructions that are executed on or across one or more processors. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices configured to implement a media streaming system comprising a streaming video previewer, wherein the media streaming system is configured to:
   receive a first portion of a video stream from a content provider at a stage of a video pipeline, wherein the video stream is received via a public network coupling the media streaming system and the content provider, wherein the media streaming system is implemented in the cloud using resources of a multi-tenant provider network, and wherein the content provider is external to the multi-tenant provider network;
   generate a first video preview of the first portion of the video stream using the streaming video previewer, wherein the first video preview comprises a lower bitrate than the first portion of the video stream;
   send the first video preview to the content provider via a peer-to-peer connection, wherein the first video preview is displayed on a device associated with the content provider;
   after the first video preview is sent to the content provider, receive an additional portion of the video stream from the content provider at the stage via the public network;
   generate an additional video preview of the additional portion of the video stream using the streaming video previewer; and
   send the additional video preview to the content provider via the peer-to-peer connection, wherein the additional video preview is displayed on the device associated with the content provider.

2. The system as recited in claim 1, wherein the media streaming system is further configured to:
   determine one or more metrics associated with ingestion of the first portion of the video stream; and
   send the one or more metrics to the content provider via the network using a data channel of the peer-to-peer connection.

3. The system as recited in claim 2, wherein the one or more metrics indicate a packet loss associated with transmission of the first portion of the video stream from the content provider to the media streaming system.

4. The system as recited in claim 1, further comprising:
   one or more computing devices configured to implement an additional stage downstream from the stage in the video pipeline, wherein the additional stage is configured to:
   receive the first portion of the video stream from the stage;
   generate a second video preview of the first portion of the video stream using the streaming video previewer; and
   send the second video preview to the content provider via a second peer-to-peer connection.

5. A computer-implemented method performed by one or more computing devices, comprising:
   receiving, from a video source, a portion of a video stream at a media streaming system, wherein the video stream is received via one or more networks between the video source and the media streaming system;
   generating, by the media streaming system, a video preview of the portion of the video stream; and
   sending the video preview of the portion of the video stream to a client device via a peer-to-peer connection, wherein the video preview of the portion of the video stream is sent before an additional portion of the video stream is received from the video source from which the portion of the video stream was received by the media streaming system, and wherein the video preview of the portion of the video stream is displayed on the client device.

6. The method as recited in claim 5, further comprising:
   determining one or more metrics associated with ingestion of the portion of the video stream; and
   sending the one or more metrics to the client device via the peer-to-peer connection.

7. The method as recited in claim 6, wherein the one or more metrics indicate a packet loss associated with transmission of the portion of the video stream to the media streaming system.

8. The method as recited in claim 6, wherein encoding of the video stream is adjusted based at least in part on the one or more metrics sent to the client device.

9. The method as recited in claim 5, wherein the video preview comprises audio.

10. The method as recited in claim 5, wherein the portion of the video stream is received and previewed at a first stage of a video pipeline, and wherein the method further comprises:
  receiving the portion of the video stream at an additional stage downstream from the first stage in the video pipeline;
  generating an additional video preview of the portion of the video stream received at the additional stage; and
  sending the additional video preview to the client device via an additional peer-to-peer connection.

11. The method as recited in claim 5, wherein the video preview of the portion of the video stream comprises a lower bitrate than the portion of the video stream.

12. The method as recited in claim 5, wherein the network comprises a publicly accessible network.

13. The method as recited in claim 5, wherein the video preview is sent via the peer-to-peer connection using a video conferencing feature of software at the client device.

14. The method as recited in claim 5, wherein the media streaming system is implemented using resources of a multi-tenant provider network, wherein the video stream is received from outside the multi-tenant provider network, and wherein the client device is external to the multi-tenant provider network.

15. One or more non-transitory computer-readable storage media storing program instructions that, when executed on or across one or more processors, perform:
  receiving, from a video source, a portion of a video stream at a media streaming system, wherein the video stream is received via one or more networks between the video source and the media streaming system, wherein the media streaming system is implemented using resources of a multi-tenant provider network, and wherein the video stream is received from outside the multi-tenant provider network;
  generating, by the media streaming system, a video preview of the portion of the video stream; and
  sending the video preview of the portion of the video stream to a client device via a peer-to-peer connection, wherein the video preview of the portion of the video stream is sent before an additional portion of the video stream is received from the video source from which the portion of the video stream was received by the media streaming system, and wherein the video preview of the portion of the video stream is displayed on the client device.

16. The one or more non-transitory computer-readable storage media as recited in claim 15, further storing program instructions that, when executed on or across one or more processors, perform:
  determining one or more metrics associated with ingestion of the portion of the video stream; and
  sending the one or more metrics to the client device via the peer-to-peer connection.

17. The one or more non-transitory computer-readable storage media as recited in claim 16, wherein encoding of the video stream at the client device is adjusted based at least in part on the one or more metrics.

18. The one or more non-transitory computer-readable storage media as recited in claim 15, wherein the portion of the video stream is received and previewed at a first stage of a video pipeline, and wherein the storage media further store program instructions that, when executed on or across one or more processors, perform:
  receiving the portion of the video stream at an additional stage downstream from the first stage in the video pipeline;
  generating an additional video preview of the portion of the video stream received at the additional stage; and
  sending the additional video preview to the client device via an additional peer-to-peer connection.

19. The one or more non-transitory computer-readable storage media as recited in claim 15, wherein the video preview of the portion of the video stream comprises a lower bitrate than the portion of the video stream.

20. The one or more non-transitory computer-readable storage media as recited in claim 15, wherein the network comprises a publicly accessible network, and wherein the video stream and the video preview are sent over the network using an internet protocol (IP).

* * * * *